United States Patent
Ritt et al.

(10) Patent No.: US 6,238,280 B1
(45) Date of Patent: May 29, 2001

(54) ABRASIVE CUTTER CONTAINING DIAMOND PARTICLES AND A METHOD FOR PRODUCING THE CUTTER

(75) Inventors: Walter Ritt, Schnifis; Johann Dorfmeister, Feldkirch-Tisis; Wolfgang Tillmann, Nüziders, all of (AT); Martin Goedickemeir, Gas (CH)

(73) Assignee: Hilti Aktiengesellschaft, Schaan (LT)

( * ) Notice: Subject to any disclaimer, the term of this patent is extended or adjusted under 35 U.S.C. 154(b) by 0 days.

(21) Appl. No.: 09/406,439

(22) Filed: Sep. 27, 1999

(30) Foreign Application Priority Data

Sep. 28, 1998 (DE) ................................. 198 44 397

(51) Int. Cl.$^7$ ........................................ B23F 21/03
(52) U.S. Cl. .................. 451/540; 451/541; 451/548; 451/556
(58) Field of Search ..................... 451/540, 541, 451/548, 556

(56) References Cited

U.S. PATENT DOCUMENTS

| | | | |
|---|---|---|---|
| 4,770,907 | * 9/1988 | Kimura | 427/217 |
| 5,024,680 | 6/1991 | Chen et al. | |
| 5,876,793 | * 3/1999 | Sherman et al. | 427/213 |
| 6,039,641 | * 3/2000 | Sung | 451/540 |

FOREIGN PATENT DOCUMENTS

| | | | | |
|---|---|---|---|---|
| 0 439 017 A1 | * 1/1991 | (EP) | | C09K/3/14 |
| 0 533 433 A1 | * 1/1991 | (EP) | | C23C/26/00 |
| 0439017 | 7/1991 | (EP) | . | |
| 0493351 | 7/1992 | (EP) | . | |
| 0533443 | 3/1993 | (EP) | . | |
| 0737510 | 10/1996 | (EP) | . | |

* cited by examiner

Primary Examiner—Joseph J. Hail, III
Assistant Examiner—Shantese McDonald
(74) Attorney, Agent, or Firm—Brown & Wood, LLP

(57) ABSTRACT

An abrasive cutter formed of at least one diamond particle, preferably at least one mono-diamond crystal and metallic binder material distinguished by the fact that the diamond particle (D) has a size of about 50 $\mu$m to about 500 $\mu$m and each diamond particle (D) is enclosed by a coating (H) produced in a fluidized bed with the coating having a wall thickness of about 10 $\mu$m to about 200 $\mu$m. The volume of the coating (H) constitutes at least 30% of the volume of the diamond particles (D) in the fully consolidated state following individual sintering of the coated diamond particles (D, H). The abrasive cutters can be applied directly onto an abrasive tool. Further they can be processed to form composite cutters or cutting segments. In the method of forming the abrasive cutter, the diamond particle (D) is brought into a fluidized bed reactor and enclosed in a metallic coating (H). Coated diamond particle (D, H) can be processed into larger cutters or segments in each case individually sintered and fixed directly on an abrasive tool.

30 Claims, 5 Drawing Sheets

ABRASIVE CUTTER CONTAINING DIAMOND PARTICLES AND A METHOD FOR PRODUCING THE CUTTER

FIELD OF THE INVENTION

The invention relates to a cutter containing diamond particles for the abrasive working of hard materials. Furthermore, the invention also relates to a method for forming such cutters.

BACKGROUND INFORMATION AND PRIOR ART

In many applications of construction technology, tools are used, which are tipped with cutters, which contain diamond particles in order to improve their abrasive properties. For preparing boreholes or openings of larger diameter, hollow drill crowns are used, equipped at their front ends with cutting segments. Wall saws and cutting-off wheels for cutting concrete, stone or ceramic are tipped at their periphery with cutting segments. Furthermore, grinding disks are also known for working hard surfaces edged at their flat side with cutters containing diamond particles. The abrasive cutters consist essentially of diamond particles, preferably diamond crystals, embedded in a metallic matrix and have a more or less regular shape. The cutting segments, with which the hollow drill crowns or wall saw blades and cutting-off blades are tipped, have a larger volume and a regular shape.

To produce the abrasive cutters or the larger cutting segments, diamond particles are mixed with a metal powder and optionally further components, such as hard material particles. The mixture of diamond particles, metal powder and optionally further components either is sintered directly and baked together into a cake-like mass, which is broken up once again into small parts in a subsequent step. After the broken parts are screened, the usable screen fractions with the suitable particle sizes are used for coating grinding disks and the like. For producing cutting segments, such as, hollow drill crowns, wall saws or cutting-off wheels, the mixture of diamond particles, metal powder and optionally further components, to begin with, is pressed into the desired shape. The resulting green compact is finally sintered, in order to combine the compressed mixture permanently.

In the case of this known method, it happens, particularly at high concentrations of diamond particles, that the diamond particles within the metal powder, acting as binder, lie directly in contact with one another. The bonding at such diamond-diamond contacts is only weak and can lead to weaknesses within the abrasive cutter. Some improvement in the situation occurs if the diamond particles are coated with a metal layer before they are mixed with the metal powder. However, only relatively thin layers can be deposited at the surface of the diamond particles with the known coating techniques. The deposition usually is accomplished by galvanic means, and layers up to about 5 μm can be achieved. CVD (chemical vapor deposition) or PVD (physical vapor deposition) techniques are relatively cumbersome and expensive. They are used sometimes in order to bond larger diamond particles better into a polymer matrix. They are generally not suitable for improving the bonding in a metallic matrix. Layer thicknesses, achievable with these coating techniques, generally are also less than those achievable with galvanic methods.

OBJECT OF THE INVENTION

It is an object of the present invention to provide an abrasive cutter and a method for its production, which eliminates the disadvantages of the cutters and of the methods of the state of the art. It is reliably possible to avoid weaknesses resulting from diamond-to-diamond contacts. The method is cost effective and permits coating layers of larger thickness. The invention shall also create the prerequisites for producing cutters with variable properties.

SUMMARY OF THE INVENTION

This objective is accomplished by an abrasive cutter, with the distinguishing features of diamond particles coated with a metallic binder material where the diamond particles have a size in the range of about 50 μm to about 500 μm and the coating is applied in a fluidized bed process. The diamond particles are completely enclosed by the coating which has a thickness in the range of about 10 μm to about 200 μm. Further a method for the production of the cutter, involves introducing diamond particles into a fluidized bed reactor so they swirl in suspension and spraying a suspension of the metallic binder material onto the diamond particles for coating each particle with a thickness in the range of about 10 μm to about 200 μm. The inventive abrasive cutter, comprising at least one diamond particle, preferably at least one diamond monocrystal, and metallic binder material, is distinguished owing to the fact that the diamond particle has a particle size, which is about 50 μm to about 500 μm and each diamond particle is surrounded by a coating produced in a fluidized bed process with a wall thickness of about 10 μm to about 200 μm. The volume of the coating is at least 30% of the volume of the diamond particle in the fully consolidated state, after individual sintering of the coated diamond particles.

Since each diamond particle is provided with a relatively thick coating, diamond-to-diamond contacts, which could lead to weaknesses in the cutter, are reliably avoided in composite cutters. Coating in the fluidized bed process is relatively simple and can be carried out relatively cost-effectively. The diamond particles are suspended in the fluidized bed and, at the same time, are swirled around. By these means, it is ensured that each diamond particle is provided with the metallic coating to the desired extent. The chemical and/or mechanical bonding of the diamond particles in the metallic matrix is improved, since the coating applied by the fluidized bed process, is denser than the coatings, which can be applied by galvanic methods or by CVD or PVD techniques. By selecting the appropriate fluidized process, the nature of the coating can be varied, for example, in order to change and adjust the properties of the abrasive cutter to the desired extent. The coated diamond particles are sintered individually. As a result, they do not bake together. The breaking of a sinter cake is omitted. The individually sintered, abrasive cutters can be processed further directly. For example, they can be applied directly to the surface of a grinding disk. As a result of the relatively thick metallic coating, the volume of which constitutes at least 30% of the volume of the diamond particles after the sintering process, the coated particles can be soldered directly to the surface. The use of an active solder or the like can be omitted.

The coating of the abrasive cutter permits the diamond particles to be coated with radially different material compositions. In this way, the chemical and physical properties of the coating can be controlled selectively in order to take into account different requirements for the cutter. The regions of different material composition of the coating are formed by different concentrations of alloying components and/or hard materials.

In a variation of the invention, the coating has a layered construction. The layered construction is composed of an innermost hard, chemical bonding layer for the diamond particles and at least one further, outwardly adjoining layer. The innermost layer comprises preferably an alloy of nickel, iron and/or cobalt with 0.5 to 15% by weight of chromium, 1 to 3% by weight of boron, 1 to 5% by weight of silicon or an alloy of copper titanate with a titanium content of 4 to 10% by weight. The at least one adjoining layer comprises 10 to 30% by weight of hard material, preferably tungsten carbide, titanium carbide, silicon carbide, silicon nitride, zirconium oxide, aluminum oxide, titanium boride, tantalum carbide, oxides of rare earth metals or mixtures thereof. The quantitative data in % by weight relate to the percentage of metal in the sintered, coated diamond particles.

In an alternative variation of the abrasive cutter, the regions of different concentrations of alloying components and/or of hard materials do not change suddenly, as in the case of a layered construction, but change essentially constantly from one to the other. Abrasive cutters, formed in this manner, have in the coating a concentration of alloying components and/or of hard materials, which has a gradient from the surface of the diamond particles to the outer surface of the cutter. In this connection, the outer regions of the coating preferably have the highest concentrations of hard materials. In this way, the abrasion resistance of the cutter is improved.

A section of the coating between the region adjoining the diamond particles and the regions furthest removed radially therefrom may have a lower concentration of alloying components and/or of hard materials. By these means, for example, the elasticity of the cutter can be improved or the thermal conductivity of the cutter affected.

Suitable as alloying components, the concentration of which in the metal coating can be adjusted variably are, for example, chromium, boron, titanium, silicon or ceramic aggregates with a low thermal conductivity, such as oxides of rare earth metals. By changing the concentration of the alloying components, the chemical and physical properties of the coating can be affected selectively. For example, the embedding of the diamond particles in the surrounding metal matrix can be improved in this manner. The addition of ceramic aggregates of low thermal conductivity prevents local overheating of the cutter in the event of inadequate cooling. As hard materials for improving the abrasiveness and the abrasion resistance of the cutters, preferably tungsten carbide, titanium carbide, silicon carbide, silicon nitride, zirconium oxide, aluminum oxide, titanium boride, tantalum carbide or mixtures thereof are used. In the case of composite cutters, the projection of the coated diamond particles over the surface of the composite cutter can also be improved in this way.

In the case of hard material particles, concentration differences in the different regions up to about 30% by weight prove to be appropriate. The concentration differences between the alloying components in the different regions amount up to about 10% by weight. The data in each case refers to the total weight of an individually sintered, coated diamond particle.

The abrasive cutters instead of being applied directly on the surface of, for example, a grinding disk, can also be combined into porous composite cutters. The porous composite cutters comprise a larger number of abrasive cutters, which are connected to one another by means of build-up granulation and subsequent sintering. The average particle size of the porous composite cutters is about 400 $\mu$m to about 1400 $\mu$m.

The abrasive cutters can also be processed further into cutting segments for hollow drill crowns, wall saw blades or cutting-off wheels. The cutting segments comprise a larger number of inventive, abrasive cutters which, optionally with addition of further metallic binders, are brought into the desired shape and combined or connected with one another by sintering or by hot pressing.

For the inventive method of producing abrasive cutters, which comprise at least one diamond particle and metallic bonding material, diamond particles with a particle size of about 50 $\mu$m to about 500 $\mu$m are brought into a fluidized bed reactor. In the fluidized bed reactor, the diamond particles are kept in suspension and continuously swirled. The diamond particles, held in suspension, are provided with a metallic coating, the wall thickness of which is about 10 $\mu$m to about 200 $\mu$m. After that, the coated diamond particles are processed further into larger cutters or sintered individually, in order to combine the metallic coating permanently with the diamond particles. During the sintering process, the volume of the coating shrinks and the coated diamond particle is consolidated. After the sintering, the coating has a volume, which is at least 30% of the volume of the diamond particles in the fully consolidated state.

The coating of the diamond particles in the fluidized bed reactor permits the metallic coating to be deposited at the desired thickness. The coating, deposited in this manner, has a greater density than the layers deposited by galvanic CVD or PVD techniques. By these means, the diamond particles are bound better into the coating. The process of coating in the fluidized bed reactor can be controlled relatively easily and also, by a suitable selection of parameters, permits the properties of the coating to be affected selectively.

Advantageously, the metal coating is deposited from a suspension, which is sprayed through a nozzle onto the diamond particles, which are held in suspension and swirled in the fluidized bed reactor by a preheated fluidizing gas, preferably air. The metallic binder material suspension comprises a solvent, preferably water, and a powdery metal, which is to be applied. An organic binder, contained in the suspension, and an additive, to adjust the rheology, constitute less than 10% of the metal powder. The organic binder preferably is polyethylene glycol. Additives, such as hard materials or ceramic aggregates can be admixed to the desired extent in the suspension.

It is advantageous for the quality of the deposited coating if the powdery metal in the suspension has an average particle size of about 0.5 $\mu$m to about 100 $\mu$m, the maximum particle size preferably being half the particle size of the diamond particles.

The metal powder, constituting the bulk of the coating applied on the diamond particles, preferably consists of an alloy based on nickel, iron and/or cobalt with addition of silicon and/or boron and surface active elements, such as chromium, with 0.5 to 15% by weight of chromium, 1 to 3% by weight of boron, 1 to 5% by weight of silicon, or of a copper titanate alloy with a titanium content of 4 to 10% by weight.

The data in weight percent refers to the metal portion of the sintered, coated diamond particles.

The chemical and/or physical properties of the coating can be adjusted particularly simply by changing the composition of the suspension sprayed into the fluidized bed reactor during the coating process.

The chemical properties of the coating can be changed particularly by changing the concentration of alloying components in the suspension. For this purpose, a variation of the alloying components to the extent of up to 10% by weight proves to be advantageous. By the selective addition and change in the concentration of ceramic aggregates and/or hard material particles of the suspension, sprayed into the fluidized bed reactor, the physical properties of the coating, such as the abrasiveness, the abrasion resistance and the thermal stability can be controlled. The extent, to which the hard material particle concentration is varied, preferably is up to about 30% by weight. In this connection, the data in weight percent refers to the total weight of the sintered, coated diamond particles.

The coated diamond particles, sintered individually to abrasive cutters, can be applied directly, particularly by soldering, on the abrasive tool, such as a grinding disk. As a result of the inventive coating, there is no need for an active solder for the soldering. The abrasive cutters can also be processed further into composite cutters. For this purpose, the coated diamond particles are subject to a build-up granulation, granulates being produced, which are processed by sintering into a composite cutter with a particle size of about 400 μm to about 1400 μm. The composite cutters can have a porous consistency or a compact construction with about 90% to about 99% of the theoretically attainable density.

Mask granulation, screen granulation or the agglomeration of several cutters in a fluidized bed process proves to be advantageous as a method of build-up granulation. For mask granulation, the coated diamond particles, with the further addition of binder by means of a pasty carrier, such as wax, and alcohols with rheological components, which prevent a demixing, are brought into the cavities of a mask. The mask may be a rigid formation of ceramic or metal. It may also be formed from an expandable mold of a synthetic resin, such as a silicone rubber. A drying step, in which the organic portion of the binder is driven off at moderate temperatures of about 50 to about 70° C., is followed by a vacuum sintering process, during which at least the solidus temperature of the predominantly metallic binder is attained. The sintering temperatures, used for this purpose, typically are between about 900° and about 1300° C. If the drying step is carried out in a ceramic or metallic mask, the pre-dried mixture can remain in the mask for the vacuum sintering process. If an appropriate material is selected, for example, a metallic mask, the sintered composite cutter subsequently does not even have to be demolded. The mask can remain as a component of the composite cutter. Aside from the advantage that the demolding is omitted, the metallic mask represents an additional, structure giving the distinguishing feature of the composite cutter.

If the mixing and drying takes place in a flexible plastic mask, the pre-dried mixture is removed from the mold before the vacuum sintering process. Easy demolding is ensured because of the high extensibility of the plastic mold. The stability of the pre-dried mixture is adequate for ensuring further safe handling. For the sintering process, the mixture is placed on a ceramic plate, such as an aluminum oxide plate, or on a corundum bed. After the vacuum sintering, the composite cutters can be removed from the corundum particles by screening.

For the screen granulation, the coated diamond particles are converted into a pasty form by means of additional organic binder and by a solvent and subsequently passed through a screen. The mesh size selected for the screening is such that the composite cutters have the desired particle size of about 400 μm to about 1400 μm after the sintering.

The third advantageous method of build-up granulation takes place in a fluidized bed process. For this, the metallically coated diamond particles are brought into a fluidized bed reactor and kept suspended in a fluidizing gas. A suspension, sprayed into the fluidized bed reactor, serves to glue the coated diamond particles together. The suspension may correspond essentially to the suspension used to coat the diamond particles and include a solvent, preferably water, a metal powder serving as binder, an organic binder, such as polyethylene glycol, additional organic additives, for example, for adjusting the rheology and, if necessary, additional powdery hard materials. The suspension may also differ from that used to coat the diamond particles. The agglomerated granulates are subsequently sintered at a temperature of about 900° to about 1250° C. and preferably at a temperature of 950° to about 1080° C.

The sintering process takes place in such a manner, that the porous composite cutters are present in isolated form after the sintering and a mechanical or chemical process is not required in order to separate them from one another. For example, the sintering takes place on a corundum bed. After the sintering process, the composite cutters can be separated from the corundum particles by screening. The particle size of the composite cutter, so produced, is about 400 μm to about 1400 μm. The composite cutters can also have a porous consistency or a compact construction with about 90 to about 99% of the theoretically attainable density.

To produce cutting segments for use in conjunction with wall saw blades, hollow drill crowns and cutting-off wheels or for producing drilling heads or cutting platelets for drilling tools, the coated diamond particles are molded by pressing into green compacts. The pressing process can take place, for example, at room temperature by means of axial or isostatic pressing. The green compacts subsequently attain their final shape by being sintered at temperatures of about 900° to about 1100°0 C. The shaping can also take place directly by means of a hot pressing process. Subsequent sintering can then be omitted.

IN THE DRAWINGS

The invention is explained in greater detail in the following with reference to the diagrammatic representations, in which FIGS. 1 and 2 are diagrammatic representations of the abrasive cutters;

DETAILED DESCRIPTION OF THE INVENTION

Figure 1:
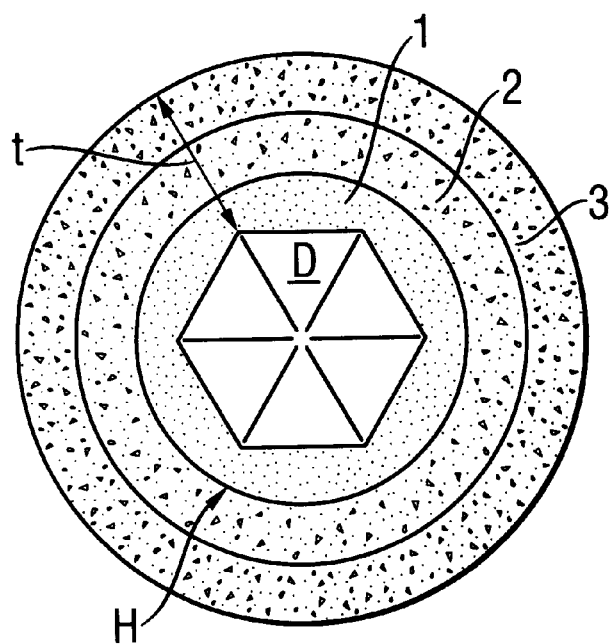
Figure 2:
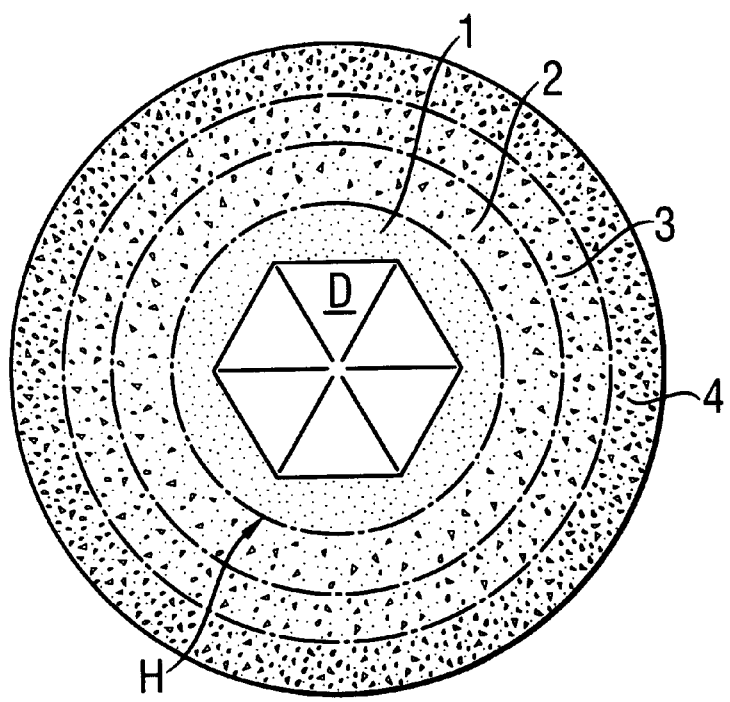

FIGS. 1 and 2 show two variations of an inventive, abrasive cutter. Both contain a diamond particle D, which is surrounded by a metallic coating H. The diamond particle D has a particle size of about 50 μm to about 500 μm. The thickness t of the coating H is about 10 μm to 200 μm. It is selected so that the coating H assumes a volume, which is at least 30% of the volume of the diamond particles D in the fully consolidated state. FIG. 1 shows a layered construction of the coating H with individual layers 1, 2 and 3 of different composition. Layer 1 represents a hard, chemical bonding layer for the diamond particles. Layer 2 may consist of the same material and is provided, for example, with additional hard materials. The outer layer 3 has, for example, an alloy of modified composition and is, for example, softer than the other layers 1, 2. The individual layers 1, 2, 3 extend radially, for example, to the same degree, which can be achieved during the production of the coating by a fluidized bed method by selecting appropriate process parameters. The composition of the individual layers 1, 2, 3, at the transition from one layer to the next, changes suddenly.

The coating H of the abrasive cutter shown in FIG. 2 has several regions, for example, four, which are labeled 1, 2, 3, 4 and have different compositions. The transitions between the individual regions are not sudden but rather continuous. For example, the composition of the coating has a gradient of concentrations of hard material particles, the concentration of hard materials increasing constantly from a region, which adjoins the diamond particles and to which no hard materials have been added, towards the outside.

Figure 5:
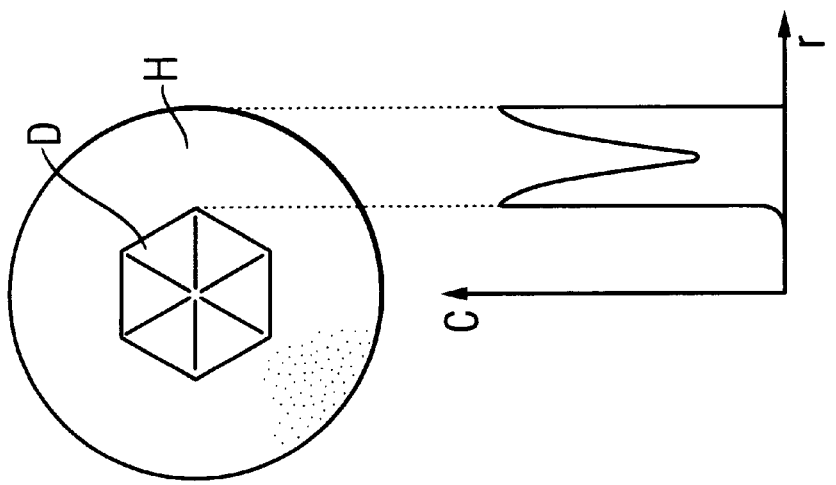
FIGS. 3 to 5 are three variations of the inventive cutters with a diagrammatic representation of the variation in the concentration of alloying components, ceramic aggregates or hard material in the coating.
Figure 4:
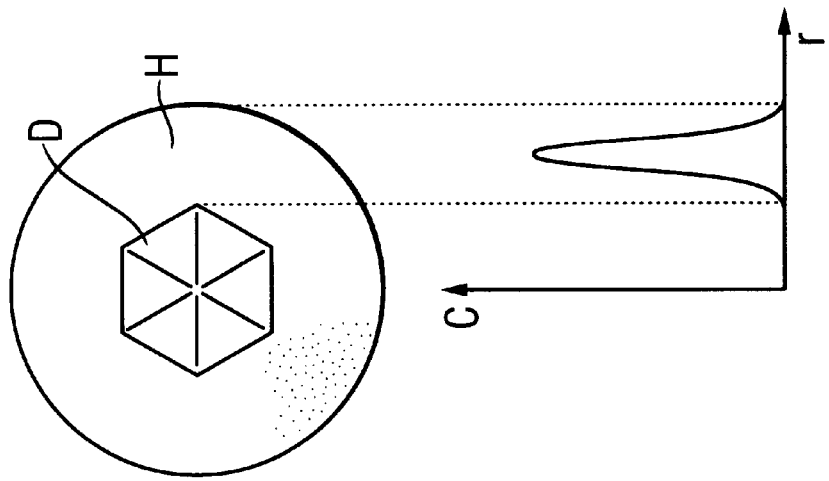
Figure 3:
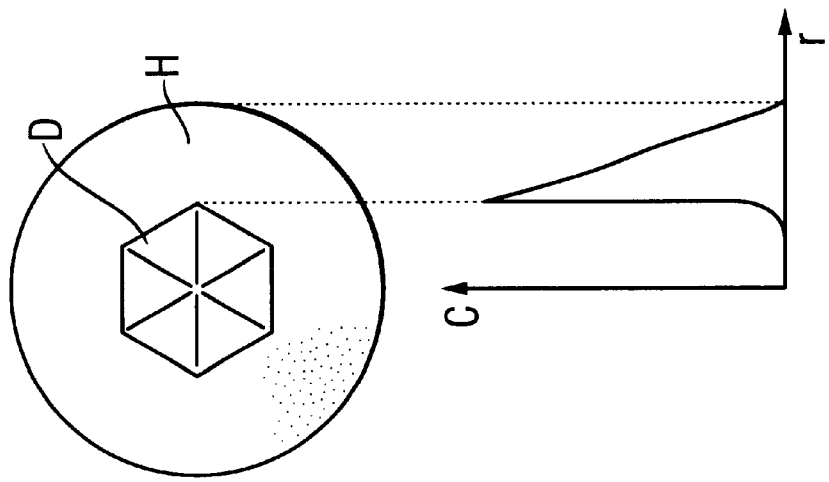

FIGS. 3 to 5 show different examples of the radially different composition of the coating H. In the diagrams, r represents the distance from the center of the cutter. In each case, the concentration C of, for example, an alloying component of the metallic coating H of the diamond particles D is given on the axis. FIG. 3 is an example of a coating with a concentration C of an alloying component, which decreases radially from the diamond particles D towards the outside. FIG. 4 indicates a coating H, for which the concentration C of an alloying component is highest approximately in the center of the radial extent r of the coating. Finally, FIG. 5 shows a coating H. for which the concentration C of an alloying component of a metallic coating has a minimum approximately in the center of its radial extent r.

Figure 6:
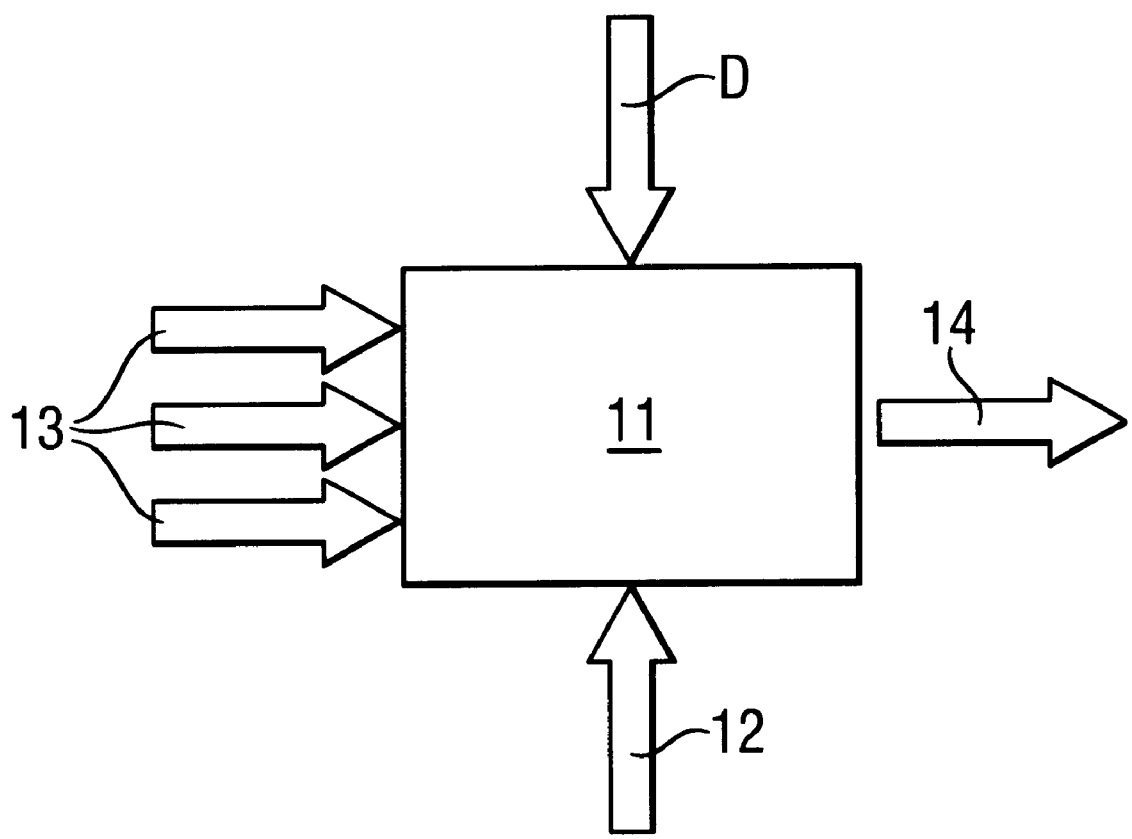
FIG. 6 is a flow diagram of a fluidized bed process for coating the diamond particles.

In FIG. 6, the flow diagram of the coating process of the diamond particles is reproduced. In the case of the inventive method, each individual diamond particle is provided with a metallic coating. For this purpose, diamond particles D, with a narrow particle size distribution and a particle size ranging from about 50 $\mu$m to about 500 $\mu$m, are brought into a fluidized bed reactor 11 and held in suspension there by a preheated fluidizing gas 12, preferably air, at a temperature of about 200C to about 1000C. The metallic coating to be applied is sprayed as a particle suspension 13 through a nozzle onto the swirling diamond particles D.

The particle suspension 13 consists of a solvent, preferably water, the metal powder, which is to be applied, an organic binder, such as, polyethylene glycol, additional, predominantly organic additives, for example, for adjusting the rheology and, optionally, further aggregates, such as hard material particles or ceramic aggregates. The proportion of organic binder is less than 10% by weight, based on the sum of the metal powder plus any aggregate. The metal powder in the suspension preferably has a particle size of about 0.5 $\mu$m to about 100 $\mu$m. The maximum particle size of the suspension is about half the diameter of the diamond particles. The metal powder consists of an alloy based on nickel, iron or cobalt with the addition of silicon and/or boron and surface-active elements, such as chromium. In an alternative variation, the metal powder of the suspension consists of a copper titanate alloy. The layer, that has been deposited, can be varied by the sequence of different suspensions or by changing the chemical composition of the suspension or by the addition of aggregate. By these means, coatings, continuously or discontinuously varying in composition, can be produced. The thickness of the coating is about 10 $\mu$m to about 200 $\mu$m. The diamond particles 14, provided in this manner with a coating, are drawn off from the fluidized bed reactor and can be processed further into larger composite cutters, to diamond segments, to drilling heads or to cutting platelets or subjected to a sintering step, during which each individual coated diamond particle 14 is sintered separately. The sintered, abrasive cutters can be mounted directly on a tool, for example, a grinding disk, for example, by soldering.

Figure 7:
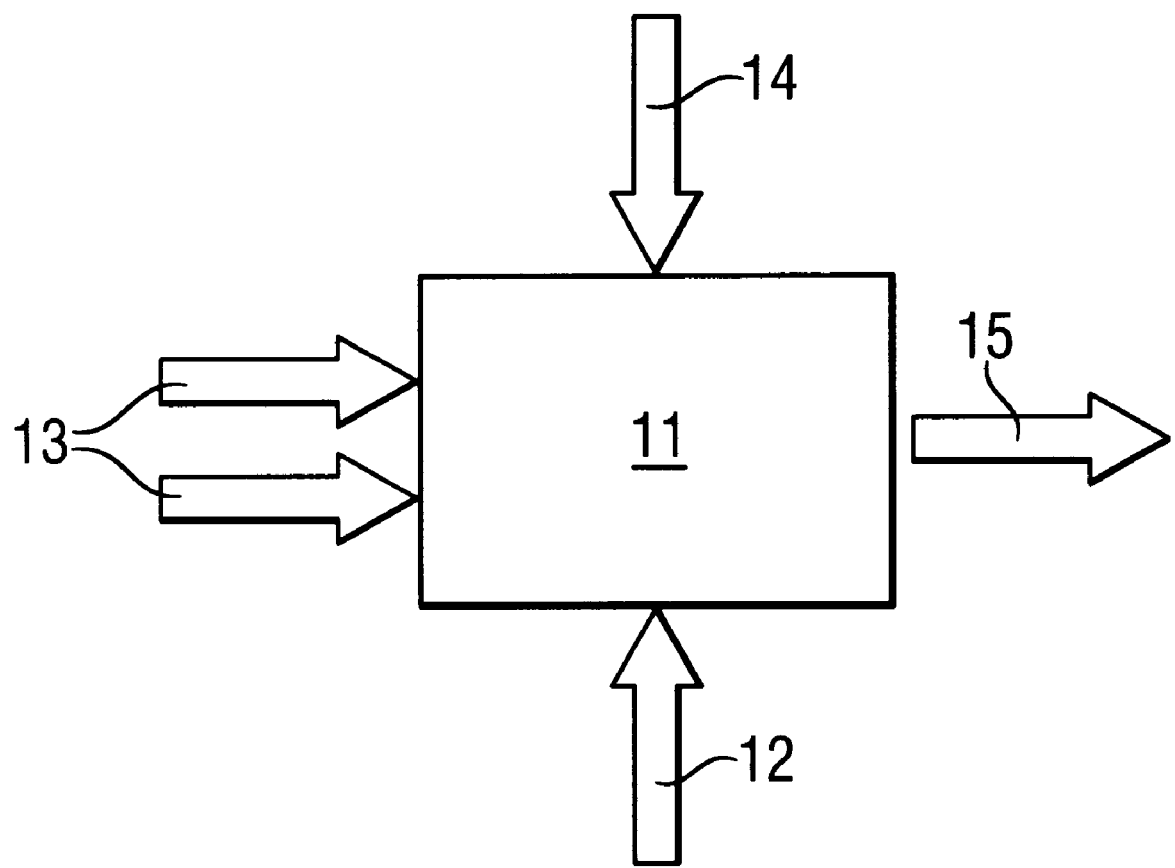
FIG. 7 is a flow diagram of a fluidized bed process for build-up agglomeration.

To process them further into porous composite cutters, the coated diamond particles 14 are subjected to a build-up granulation, in order to produce larger composite cutters with a particle size of about 400 $\mu$m to about 1400 $\mu$m. Mask granulation, screen granulation or the addition of several cutters in a fluidized bed process are used as methods for build-up granulation. FIG. 7 shows a flow diagram of a build-up granulation in a fluidized bed reactor. The sequence of events corresponds essentially to that explained with the help of FIG. 6. The fluidized bed 11 is formed of coated diamond particles 14, held in suspension by a fluidizing gas 12. A suspension 13 for gluing the coated diamond particles 14 together, is sprayed in through a nozzle. The suspension comprises a solvent, preferably water, a metal powder, an organic binder, such as polyethylene glycol, additional organic additives and, if necessary, additional aggregates, such as hard material particles, ceramic aggregates, etc. The composition of the suspension can correspond essentially to that of the suspension used for coating the diamond particles. The agglomerated granulate 15 of the desired particle size is drawn off from the fluidized bed reactor and sintered into composite cutters at a temperature of 900° C. to about 1250° C. and preferably of 950° C. to about 1080° C.

Figure 8:
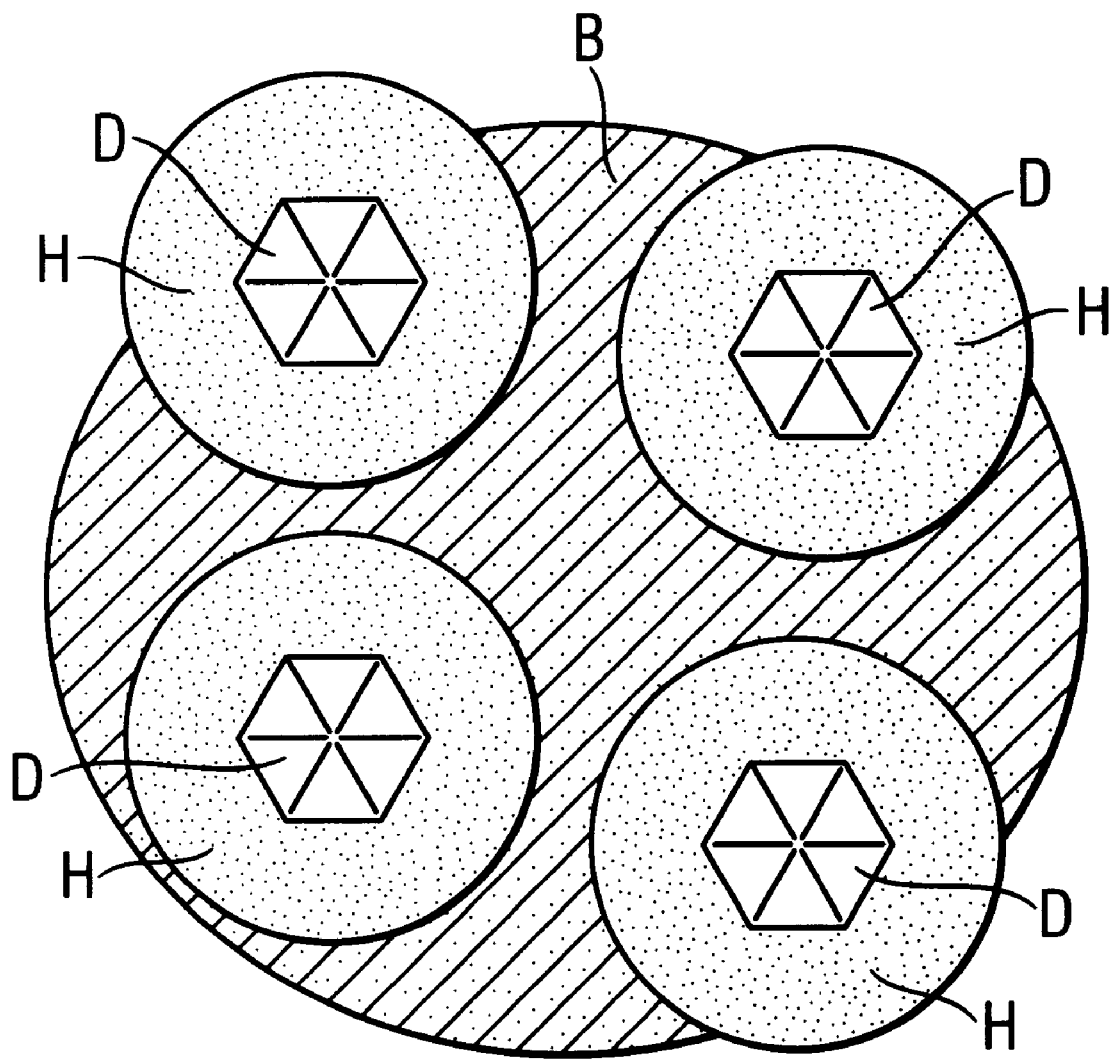
FIG. 8 illustrates a composite cutter.

FIG. 8 diagrammatically shows an example of a composite cutter, which consists of a number of diamond particles D, which are provided with a coating H and embedded in a binder B. The coated diamond particles D partially protrude from the surface of the composite cutter. In use, the composite cutter is self-sharpening, in that, initially, the diamond particles, protruding from the surface, are worn away and gradually, by abrasion of the binder material B, new coated diamond particles D are exposed.

The materials, used to coat the coated diamond particles or to process them further, are based on nickel, iron and/or cobalt with addition of 0.5 to 15% by weight of chromium, 1 to 3% by weight of boron and 1 to 5% by weight of silicon. Copper titanate, based on copper alloyed with 4% by weight to 10% by weight of titanium, is an alternative metal alloy. The quantitative data is based on the weight of the metal portion of the sintered, coated diamond particles.

As hard materials, tungsten carbide in the form of WC and $W_2C$, titanium carbide, silicon carbide, silicon nitride in the form of $Si_3N_4$, stabilized or not stabilized zirconium oxide, aluminum oxide, titanium boride, tantalum carbide, oxides of rare earth metals, such as $CeO_2$ or $Gd_2O_3$, or mixtures of the same come into consideration.

Organic additives, as a component of the particle suspensions for the fluidized bed process are, for example, water, isopropanol, ethanol, methanol, hexane, benzene or toluene, in each case as solvent, and polyethylene glycol, stearic acid, stearates or thixotropic materials, as binders or theological components.

The following are examples of abrasive cutters with a coating of discrete construction similar to that explained by means of FIG. 1.

EXAMPLE 1

Diamond particles of a narrow particle size distribution from about 50 $\mu$m to about 500 $\mu$m are coated in a fluidized bed process from a suspension sprayed in with a metallic coating of NiCrBSi. The metallic coating, comprising only one layer, is based on nickel with the addition of 0.5 to 15% by weight of chromium, 1 to 3% by weight of boron and 1 to 5% by weight of silicon. The coated diamond particles are sintered individually.

EXAMPLE 2

Like Example 1, with the exception that, after the first layer, the composition of the suspension is changed. A second, middle layer of NiCrBSi, to which 10 to 30% by weight of WC and/or $W_2C$, is added After the second layer is deposited, the original suspension is sprayed in once again and an outer layer of NiCrBSi is deposited.

EXAMPLE 3

Like Example 1, with the difference that, by the selective change in the composition of the suspension sprayed in, a second, middle layer of NiCrBSi, with addition of 30% by weight of WC and/or $W_2C$, and an outer layer of NiCrBSi, with addition of 10% by weight of WC and/or $W_2C$, are deposited.

EXAMPLE 4

Diamond particles of a narrow particle size distribution from about 50 μm to about 500 μm are coated in a fluidized bed process from a suspension sprayed in with a metallic coating of CuTi. The metallic coating is based on copper, alloyed with 4% by weight to 10% by weight of titanium. The coated diamond particles are sintered individually.

EXAMPLE 5

Like Example 4, but with the difference that, after the first layer with the desired thickness is produced, the composition of the suspension is changed and a second middle layer of $CuTi_5$, with 10% to 30% by weight of WC and/or $W_2C$, is deposited.

EXAMPLE 6

Like Example 2, with the difference that TiC is added instead of WC and/or $W_2C$.

EXAMPLE 7

Like Example 2, with the difference that $ZrO_2$ instead of WC or $W_2C$ is used.

Further variations are based on Examples 2 or 6 differ only in the nature of the hard material particles.

The following examples relate to coatings, which have a hard material gradient, as illustrated by means of FIG. 2.

EXAMPLE 8

Diamond particles of a narrow particle size distribution from about 50 μm to about 500 μm are coated in a fluidized bed process, from a suspension sprayed in, with a metallic coating of NiCrBSi. The metallic coating, comprising only one layer, is based on nickel with the addition of 0.5 to 15% by weight of chromium, 1 to 3% by weight of boron and 1 to 5% by weight of silicon. During the coating process, the proportion of hard material particles, added to the suspension sprayed in, is increased continuously. The concentration of the hard material particles varies from 0 to 30% by weight. The coated diamond particles are sintered individually.

EXAMPLE 9

Like Example 4, during the coating, an increasingly greater proportion of hard material particles is added to the suspension that is sprayed in. The proportion of hard materials varies from 0% by weight to 30% by weight.

EXAMPLE 10

Like Example 4. after the first layer is produced, an amount of hard material, increasing from 0% by weight to 30% by weight, is added to the suspension.

EXAMPLE 11

Like Example 10. After the concentration of hard material particles has reached 30%, the concentration of hard material particles in the suspension is reduced once again continuously.

EXAMPLE 12

Like Example 8. After the concentration of hard material particles has reached 30%, it is reduced once again continuously.

The following examples specify metallic coatings, for which the concentration of one or more alloying component is varied over the radius of the coating, as is indicated in FIGS. 3 to 5.

EXAMPLE 13

Diamond particles of a narrow particle size distribution from about 50 μm to about 500 μm are coated in a fluidized bed process, from a suspension sprayed in, with a metallic coating of NiCrBSi. The chromium content of the alloy in the suspension sprayed in is reduced from 5% to 15% by weight to 0.5% to 10% by weight. The coated diamond particles are sintered individually.

EXAMPLE 14

Like Example 13. Instead of the chromium, the silicon content is varied to the extent given.

EXAMPLE 15

Like Example 13. Instead of chromium, the boron content is reduced to the extent given.

EXAMPLE 16

Like Example 4. During the coating process, the titanium content is reduced from 4% to 10% by weight to 0% to 5% by weight.

EXAMPLE 17

Like Example 1. During the coating process, the silicon concentration in the alloy initially is increased from a few tenths percent up to 5% by weight and then reduced again to a few tenths percent.

EXAMPLE 18

Like Example 1. During the coating process, the boron concentration in the alloy initially is increased from a few tenths percent up to 3% by weight and then reduced again to a few tenths percent.

EXAMPLE 19

Like Example 4. During the coating process, the titanium content is increased continuously from 5% by weight to 10% by weight and then reduced again to 5% by weight.

EXAMPLE 20

Like Example 1. During the coating process, the chromium concentration of the alloy is lowered from 3% to 15% by weight to 0% to 5% by weight and then increased again to the original value.

EXAMPLE 21

Like Example 1. The boron content of the alloy is decreased from 3% by weight to 1% by weight and then increased again to the original value.

EXAMPLE 22

Like Example 1. The silicon content of the alloy is decreased from 5% by weight to 2% by weight and then increased once again.

EXAMPLE 23

Like Example 4. During the coating process, the titanium content of the alloy is reduced from 10% by weight to 5% by weight and then increased once again to the original value.

The following examples relate to composite cutters of FIG. 8, which are produced by build-up granulation from coated diamond particles in a fluidized bed process of FIG. 7. Coated diamond particles of one of the Examples 1 to 23 are used as starting material for the fluidized bed process. Mixtures of coated diamond particles of one of the Examples listed can also be used. The build-up granulation continues until composite cutters with an average particle size of about 400 μm to about 1400 μm are produced. The composite cutters are consolidated in a subsequent sintering step at a temperature of 900° to 1250° C. and preferably of 950° to 1080° C. The composite cutters may have a porous consistency or a compact construction with about 90% to about 99% of the theoretically attainable density.

EXAMPLE 24

For the build-up granulation, a suspension, containing a metal powder based on nickel, iron or cobalt, preferably NiCrBSi metal powder with 1 to 3% by weight of boron and 1 to 5% by weight of silicon and a chromium content, which is higher than the chromium content of the original suspension sprayed in for coating the diamond particles. Preferably, the chromium content of the metal powder is about 5% by weight to about 15% by weight.

EXAMPLE 25

For the build-up granulation, a suspension, containing a metal powder based on nickel, iron or cobalt, preferably NiCrBSi metal powder with 1 to 3% by weight of boron and 1 to 5% by weight of silicon and a chromium content, which is lower than the chromium content of the original suspension sprayed in for coating the diamond particles. Preferably, the chromium content of the metal powder is about 0.5% by weight to about 10% by weight.

EXAMPLE 26

The build-up granulation is carried out with the addition of a binder containing NiCrBSi metal powder with 0.5% to 15% by weight of chromium, 1% to 3% by weight of boron and 1 to 5% by weight of silicon with the addition of 10% to 30% by weight of hard materials. Preferably, WC, $W_2C$ or TiC come into consideration as hard materials.

EXAMPLE 27

Like Example 24, with the addition of 10% to 30% by weight of hard materials.

EXAMPLE 28

Like Examples 26 or 27, the proportion of hard materials in the suspension, sprayed into the fluidized bed reactor, being increased continuously during the build-up granulation from 10% by weight to 30% by weight.

What is claimed is:

1. An abrasive cutter comprising at least one diamond particle and metallic binder material wherein said diamond particle (D) has a size in the range of about 50 μm to about 500 μm and having a volume, a coating (H) of said metallic binder material is applied in a fluidized bed process and completely encloses said diamond particle, said coating (H) having a thickness (t) in a range of 10 μm to about 200 μm, said diamond particle and coating being individually sintered and after the sintering the coating (H) having a volume of at least 30% of the volume of said diamond particle.

2. An abrasive cutter, as set forth in claim 1, wherein said diamond particle comprises at least one diamond monocrystal.

3. An abrasive cutter, as set forth in claim 1, wherein said coating (H) has regions (1, 2, 3, 1–4) with different compositions of said metallic binder material with the different compositions varying from an outer surface of the diamond particle (D) to an outer surface of the coating (H).

4. An abrasive cutter, as set forth in claim 3, wherein the regions (1–4) of different metallic binder material compositions of the coating are formed by different concentrations (C) of at least one of alloying components and hard materials changing over gradually from one region to the other.

5. An abrasive cutter, as set forth in claim 4, wherein the concentration of at least one of the alloying components and hard materials has a gradient from a surface of the diamond particle to an outer surface of the coating with the outer regions of the coating having higher concentrations (C).

6. An abrasive cutter, as set forth in claim 3, wherein the said metallic binder material comprises at least one of alloying components and hard materials, and said different compositions are formed of different concentrations (C) of at least one of the alloying components and hard materials.

7. An abrasive cutter, as set forth in claim 6, wherein the different material compositions of the said coating (H) comprises a layered arrangement (1, 2, 3) with an innermost hard chemical bonding layer (1) in direct contact with the diamond particle and comprising an alloy of nickel, iron and cobalt with 0.5 to 15% by weight of chromium, 1–3% by weight of boron, 1–5% by weight of silicon, and at least one further outer layer (2) comprising 10–30% by weight of hard material comprising at least one of tungsten carbide,titanium carbide, silicon carbide, silicon nitrate, zirconium oxide, aluminum oxide, titanium boride tantalum carbide, and oxides of rare earth materials and mixtures thereof, the quantitative data being related to the weight of the metallic binder material content of the sintered coated diamond particles.

8. An abrasive cutter as set forth in claim 6, wherein the different material compositions of said coating (H) has a layered construction (1, 2, 3) with an innermost hard chemical bonding layer (1) in direct contact with an outer surface of said diamond particle comprising an alloy of nickel and cobalt with 0.5 to 15% by weight of chromium, 1–3% by weight of boron, 1–5% by weight of silicon, and alloy of copper titanate with a titanium content of 4–10% by weight, and at least one tungsten carbide, titanium outer layer (2) comprising 10–30% by weight of hard material including at least one of carbide, titanium carbide, silicone carbide, silicone nitride, zirconium oxide, aluminum oxide, titanium boride, tantalum carbide and oxides of rare earth metals and mixtures thereof, with the quantitative data being related to the weight of the metallic binder material content of the sintered coated diamond particle.

9. An abrasive cutter, as set forth in claim 6, wherein a region (3, 4) of said coating disposed between a region (1) adjoining the surface of the diamond particle and the regions more remote therefrom has a lowest concentration (C) of at least one of said alloying components and hard materials.

10. An abrasive cutter, as set forth in claim 6, wherein said alloying components comprised of at least one of chromium, boron, titanium and silicon and the hard material comprised of at least one of tungsten carbide, titanium carbide, silicon carbide, silicon nitride, zirconium oxide, aluminum oxide, titanium boride, tantalum carbide and mixtures thereof.

11. An abrasive cutter, as set forth in claim 10, wherein the difference in concentration of hard material particles in the different regions amounts to about 30% by weight.

12. An abrasive cutter, as set forth in claim 10, wherein the difference in concentration of alloying components in the different regions amounts to about 10% by weight.

13. An abrasive cutter, as set forth in claim 6, wherein the alloying components comprise ceramic aggregates with a low thermal conductivity such as oxides of rare earth metals, and the hard materials comprised at least one of carbide, titanium carbide, silicon carbide, silicon nitride, zorconian oxide, aluminum oxide, titanium boride, tantalum carbide and mixtures thereof.

14. A method, as set forth in claim 13, comprising a step of forming the coated diamond particles (D, H) into one of cutting segments, drilling heads and drilling platelets by hot pressing the coated diamond particles into one of cutting segments, drilling heads and drilling platelets.

15. Composite cutters comprising a number abrasive cutters, as set forth in claim 1, comprising steps of connecting said abrasive cutters by build up granulation and then sintering the interconnected abrasive cutters, and the composite cutter having an average particle size in the range of 400 μm to about 1400 μm.

16. Cutting segments for hollow drill crowns, wall saw blades , and cutting-off wheels comprising a number of abrasive cutters as set forth in claim 1, wherein adding additional metallic binder material and sintering the abrasive cutters into the desired shape.

17. Cutting segments for hollow drill crowns, wall saw blades , and cutting-off wheels comprising a number of abrasive cutters as set forth in claim 1, wherein adding additional metallic binder material and hot pressing the abrasive cutters into the desired shape.

18. A method of forming an abrasive cutter made of at least one diamond particle and a metallic binder material comprising steps of introducing diamond particles having a size in the range of about 50 μm to about 500 μm into a fluidized bed reactor and maintaining said diamond particles swirling in suspension by a fluidized gas, spraying a suspension of the metallic binder material onto said diamond particles in suspension and coating each diamond particle for a thickness (t) in the range of about 10 μm to about 200 μm and sintering each coated diamond particle so that the coating has a volume of at least 30% of the volume of the diamond particle in the final sintered state.

19. A method, as set forth in claim 18, wherein depositing the metallic binder material coating (H) from a suspension comprising a solvent a powdery metal for forming the coating, which is less then 10% by weight based on the weight of metal powder and any aggregate, an organic binder, and additives for adjusting the rheology, and spraying the suspension through a nozzle onto the diamond particles and maintaining the diamond particles in suspension and swirled by a preheated fluidized gas in the fluidized bed reactor.

20. A method, as set forth in claim 19, wherein the solvent is water.

21. A method, as set forth in claim 19, wherein the organic binder is polyethylene glycol.

22. A method, as set forth in claim 19, wherein the preheated fluidizing gas is air.

23. A method, as set forth in claim 22, comprising the step of changing the composition of the suspension sprayed into the fluidized bed reactor during the coating step.

24. A method, as set forth in claim 23, wherein the suspension comprises at least one of an alloying component, ceramic aggregate and hard material particles and changing the concentration of the suspension during the coating step.

25. A method, as set forth in claim 19, wherein the powdery metal in suspension has an average particle size in the range of about 0.5 μm to about 100 μm and the maximum particle size being half the size the diamond particle.

26. A method, as set forth in claim 25, wherein the powdery metal comprises an alloy based on nickel and at least one of cobalt with the addition of silicon and boron and surface-active elements comprising at least one of chromium and a copper titanate alloy.

27. A method, as set forth in claim 18, comprising the step of subjecting coated diamond particles (D, H) to a build-up granulation for producing granulates and sintering the granulates into a composite cutter with a particle size of about 400 μm to about 1400 μm.

28. A method, as set forth in claim 27, comprising the step of effecting the built-up granulation by one of mask granulation and screen granulation.

29. A method, as set forth in claim 27, comprising the step of effecting the built-up granulation by the addition of several coated diamond particles in a fluidized bed process.

30. A method, as set forth in claim 18, comprising the step of forming the coated diamond particles (D, H) into one of cutting segments, drilling heads and drilling platelets by pressing the coated diamond particles at an ambient temperature into a green compact and sintering the green compact.

* * * * *